United States Patent [19]

Kuraishi

[11] 4,183,647
[45] Jan. 15, 1980

[54] ELECTRONIC FLASH APPARATUS

[75] Inventor: Kaoru Kuraishi, Tokyo, Japan

[73] Assignee: Toshiba Photo Products Co., Ltd., Tokyo, Japan

[21] Appl. No.: 948,969

[22] Filed: Oct. 5, 1978

[30] Foreign Application Priority Data

Oct. 11, 1977 [JP] Japan .................................. 52-136011

[51] Int. Cl.² ........................................... G03B 15/05
[52] U.S. Cl. ...................................... 354/132; 354/145
[58] Field of Search ................ 354/132, 145; 315/182, 315/183, 241 P

[56] References Cited

U.S. PATENT DOCUMENTS

| 3,494,269 | 2/1970 | Lieser | 354/132 |
| 3,782,258 | 1/1974 | Boekkooi et al. | 354/132 X |

Primary Examiner—Michael L. Gellner
Attorney, Agent, or Firm—Darby & Darby

[57] ABSTRACT

An electronic flash apparatus capable of flash-photographing by means of an electronic flash discharge tube and a flash lamp. The electronic flash apparatus is so constructed that a sub-flash apparatus with a flash lamp may be removably attached thereto. When the flash discharge tube built in the electronic flash apparatus is triggered by a trigger circuit to flash, the flash lamp of the sub-flash apparatus is at the same time triggered to flash.

4 Claims, 3 Drawing Figures

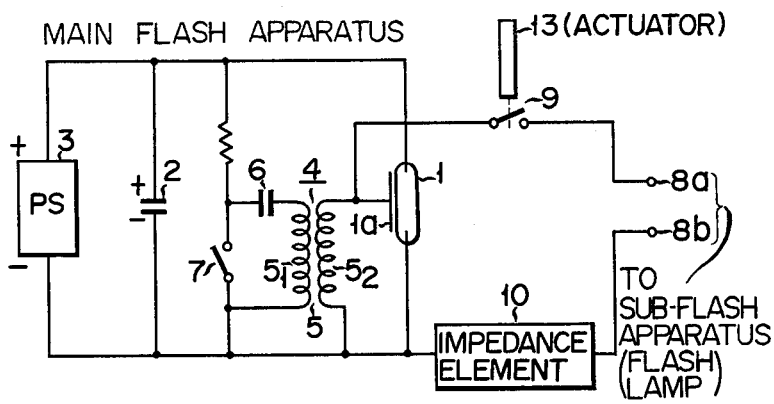
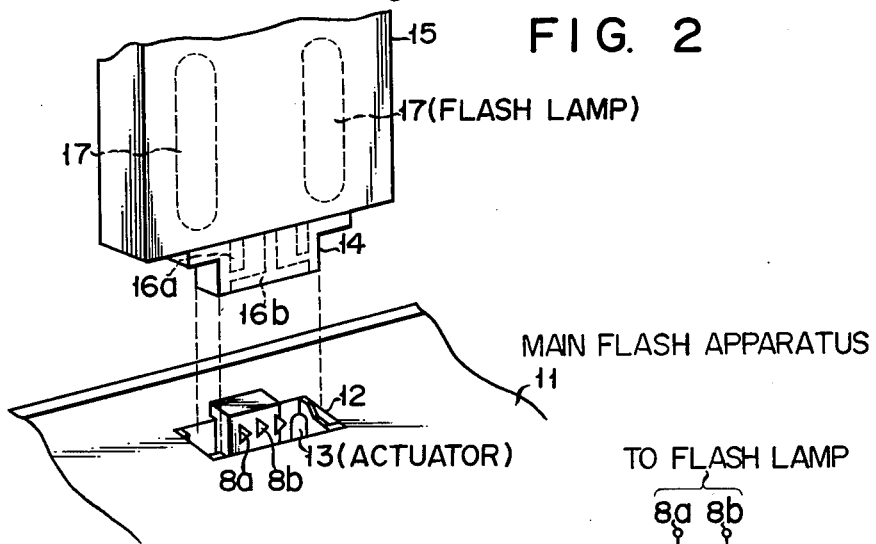
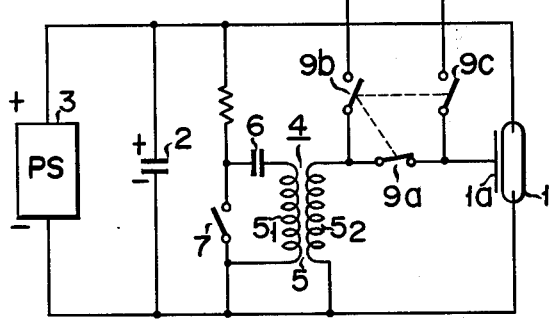

ELECTRONIC FLASH APPARATUS

BACKGROUND OF THE INVENTION

This invention relates to an electronic flash apparatus provided with a flash discharge tube, and more particularly, to an electronic flash apparatus provided with a flash discharge tube to which a sub-flash apparatus with a flash lamp is detachably attached.

SUMMARY OF THE INVENTION

The object of this invention is to provide an electronic flash apparatus having a flash discharge tube to which a sub-flash apparatus for a flash lamp is detachably attached.

According to this invention, there is provided an electronic flash apparatus comprising a power source, a capacitor connected in parallel with the power source, a trigger circuit connected with the capacitor and having a synchro-contact interlocking with the shutter release button of a camera, the trigger circuit producing a high voltage when the synchro-contact is closed, a flash discharge tube connected in parallel with the capacitor and flashing in response to the high voltage produced by the trigger circuit, first contacts with which second contacts of a sub-flash apparatus connected with a flash lamp come into contact when the sub-flash apparatus having the second contacts connected to the flash lamp is externally attached to the electronic flash apparatus, and switch means to connect the first contacts to the trigger circuit when the sub-flash apparatus is attached to the electronic flash apparatus.

BRIEF DESCRIPTION OF THE DRAWINGS

FIG. 1 is a schematic circuit diagram of an embodiment of this invention;

FIG. 2 shows a connection of a sub-flash apparatus with a flash lamp to an electronic flash apparatus with a flash discharge tube; and FIG. 3 is a schematic circuit diagram of another embodiment of the invention.

DETAILED DESCRIPTION OF THE PREFERRED EMBODIMENT

Referring now to FIG. 1, there is shown an embodiment of this invention which includes a conventional electronic flash apparatus composed of a flash discharge tube 1 such as a xenon tube, a main capacitor 2, a power source 3, and a trigger circuit 4. More specifically, the flash discharge tube 1 is connected in parallel with the main capacitor 2 and the power source 3. The trigger circuit 4 includes a transformer 5, a capacitor 6, and a synchro-contact 7, the capacitor 6 and the primary winding $5_1$ of the transformer 5 being connected in series with each other across the capacitor 2. The synchro-contact 7 is connected in parallel with the series circuit of the capacitor 6 and the primary winding $5_1$ of the transformer 5. A secondary winding $5_2$ of the transformer 5 is connected between the trigger electrode and cathode of the discharge tube 1.

In the aforesaid electronic flash apparatus, the synchro-contact 7 is closed in synchronism with the shutter release button of an associated camera, whereby the capacitor 6 discharges instantaneously through the primary winding $5_1$ of the transformer 5 to induce a high voltage (2 to 3 kV) across the secondary winding $5_2$. The discharge tube 1 is triggered by such a high voltage to lower the internal impedance of the discharge tube 1. Consequently, the main capacitor discharges through the discharge tube 1 to flash.

According to the electronic flash apparatus of this invention, there is provided a pair of connecting terminals 8a and 8b to be electrically connected to a sub-flash apparatus incorporating a flash lamp; the terminal 8a is connected to one terminal of the secondary winding $5_2$ of the transformer 5 through a normally open switch 9, while the terminal 8b is connected to the other terminal of the secondary winding $5_2$ through an impedance element 10.

The connecting terminals 8a and 8b are so disposed as to be exposed in a recess (socket) 12 formed at the top of a body 11 of the electronic flash apparatus as shown in FIG. 2. The socket 12 is so formed that a plug 14 formed at the bottom of a sub-flash apparatus may be inserted therein. When the plug 14 is inserted in the socket 12, external connecting terminals 16a and 16b of the plug 14 connected to the flash lamp comes in contact with the connecting terminals 8a and 8b of the electronic flash apparatus. Disposed inside the socket 12 of the electronic flash apparatus is an actuator 13, which is pushed to close the normally open switch 9, as shown in FIG. 1, when the plug 14 of the sub-flash apparatus 15 is inserted into the socket 12. As a result, the sub-flash apparatus 15 is electrically connected with the trigger circuit 4 of the electronic flash apparatus 11.

In the sub-flash apparatus 15 is provided at least one flash lamp 17 consisting of a miniature glass envelope filled with aluminium or zirconium wire, which flashes simultaneously with the discharge tube 1 by means of a large electromotive force induced in the secondary winding $5_2$ of the transformer 5 when the synchro-contact 7 is closed by the shutter release button of the associated camera, with the sub-flash apparatus attached to the electronic flash apparatus. Thus, photographing can be achieved under stronger light as compared with the case where the electronic flash apparatus alone is used.

The impedance element 10, which is provided for the secure triggering of the flash discharge tube when using the flash lamp, may be a resistor or capacitor.

If the sub-flash apparatus is so designed as to be used with two or more flash lamps, a known circuit means for successively triggering the flash lamps to take pictures may be built in the sub-flash apparatus. As the sub-flash apparatus, the commercially available multiple flash unit which is known by the trade name "FLIP-FLASH" may be used.

In the aforementioned construction, the normally open switch will protect the exposed connecting terminals 8a and 8b from high voltage to avoid electric shocks when the sub-flash apparatus is not used.

FIG. 3 shows another embodiment of this invention, in which normally closed switch 9a is connected between the second winding $5_2$ of the transformer 5 and the trigger electrode 1a of the flash discharge tube 1. A first normally open switch 9b is connected between the external connecting terminal 8a and one terminal of the normally closed switch 9a, while a second normally open switch 9c is connected between the external connecting terminal 8b and the other terminal of the normally closed switch 9a.

The switches 9a, 9b and 9c are driven by the actuator 13 when the sub-flash apparatus is attached to the electronic flash apparatus; the switch 9a opens, whereas the switches 9b and 9c are closed. In this embodiment, the flash lamp and the flash discharge tube are connected in series with each other. When the flash lamp 17 is fired by a high voltage delivered from the transformer 5, the flash discharge tube 1 is triggered to fall into a low-impedance state. As a result, the flash lamp 17 and the flash discharge tube 1 produce flashes simultaneously.

What is claimed is:

1. An electronic flash apparatus comprising: a power source; a capacitor connected in parallel with said power source; a trigger circuit connected with said capacitor and having a synchron-contact interlocking with the shutter of a camera, said trigger circuit producing a high voltage when said synchro-contact is closed; a flash discharge tube connected in parallel with said capacitor and triggered in response to the high voltage produced by said trigger circuit to flash by a discharge of said capacitor through said discharge tube; first contacts with which second contacts of a sub-flash apparatus with a flash lamp come into contact when said sub-flash apparatus having said second contacts connected to said flash lamp is externally attached to said electronic flash apparatus; and switch means to connect said first contacts to said trigger circuit when said sub-flash apparatus is attached to said electronic flash apparatus.

2. An electronic flash apparatus according to claim 1, wherein said switch means has a normally open switch connected between said trigger circuit and one of said first contacts, said normally open switch being closed when said sub-flash apparatus is attached to said electronic flash apparatus.

3. An electronic flash apparatus according to claim 2, wherein an impedance means is connected in series with said normally open switch and said trigger circuit.

4. An electronic flash apparatus according to claim 1, wherein said switch means includes a normally closed switch connected between said trigger circuit and said discharge tube, and first and second normally open switches respectively connected between one terminal of said normally closed switch and one of said first contacts and between the other terminal of said normally closed switches and the other of said first contacts, said normally closed switch and said first and second normally open switches being opened and closed, respectively, when said sub-flash apparatus is attached to said electronic flash apparatus.

* * * * *